United States Patent [19]

Montgomery et al.

[11] 4,163,682

[45] Aug. 7, 1979

[54] METHOD FOR DISPOSING OF RED PHOSPHORUS COMPOSITION

[75] Inventors: Francis E. Montgomery, Bloomfield; James E. Short, Jr., Switz City; William J. Weaver, Washington, all of Ind.

[73] Assignee: The United States of America as represented by the Secretary of the Navy, Washington, D.C.

[21] Appl. No.: 948,737

[22] Filed: Oct. 5, 1978

[51] Int. Cl.[2] ............................................. C06B 25/02
[52] U.S. Cl. .................................. 149/108.4; 149/29; 149/30; 149/109.6
[58] Field of Search ............... 149/29, 30, 109.6, 108.4

[56] References Cited

U.S. PATENT DOCUMENTS 3,607,472 9/1971 Douda ............................... 149/30 X
4,113,841 9/1978 Staendeke et al. ................. 149/29 X Primary Examiner—Stephen J. Lechert, Jr.
Attorney, Agent, or Firm—R. S. Sciascia; Paul S. Collignon

[57] ABSTRACT

A method for disposing of a pyrotechnic composition comprised of red phosphorus, manganese dioxide, magnesium, zinc oxide and linseed oil, with at least fifty percent of the composition being red phosphorus. The composition is burned in a first enclosed chamber and the products of combustion are drawn into a second enclosed chamber and burned. The product gases from the second enclosed chamber are sprayed with water to form phosphoric acid which is collected. The ashes in the first enclosed chamber are sprayed with water to produce phosphine which is burned in the first enclosed chamber and the residue is an inert ash.

8 Claims, 1 Drawing Figure

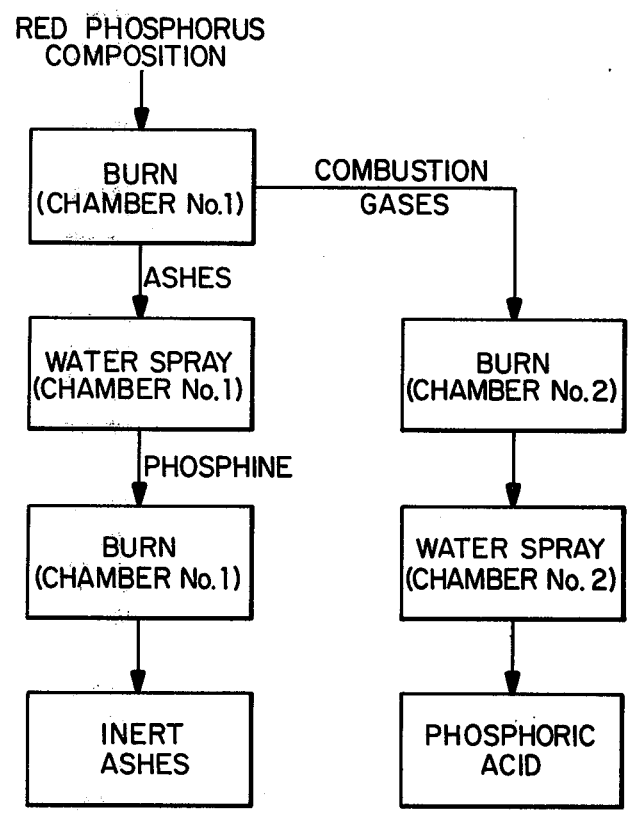

METHOD FOR DISPOSING OF RED PHOSPHORUS COMPOSITION

BACKGROUND OF THE INVENTION

The invention relates to a method for disposing of pyrotechnic flares containing red phosphorus and more particularly to a non-polluting method for disposing of flares comprised of red phosphorus, manganese dioxide, magnesium, zinc oxide, and linseed oil, and also for a method of disposing of waste materials which come from the manufacture of such flares.

It is necessary to dispose of waste pyrotechnic flare compositions as its storage is both costly and hazardous. Waste flare composition may either be bulk composition, left over from a production run or might be from defective flare candles. Heretofore, disposal of obsolete, outdated, or unserviceable conventional ammunition items has been performed mainly by either deep-water dumping or by open field burning. Neither of these disposal methods, however, result in the salvage of valuable materials. Additionally, deep-sea dumping is a costly procedure and open burning causes atmospheric pollution.

SUMMARY OF THE INVENTION

The present invention relates to a process for disposing of pyrotechnic compositions comprised of red phosphorus, manganese dioxide, magnesium, zinc oxide and linseed oil. The composition is burned in a first enclosed chamber and the products of combustion are drawn into a second enclosed chamber and burned. The product gases from the second enclosed chamber are sprayed with water to form phosphoric acid which is collected and is useful as a fertilizer. The ashes in the first enclosed chamber are sprayed with water to produce phosphine which is burned in the first enclosed chamber and the residue is inert ashes.

It is therefore a general object of the present invention to provide a method for disposing of a flare composition which is safe and non-polluting of the environment.

Other objects, advantages and novel features of the present invention will become apparent from the following detailed description of the invention when considered in conjunction with the accompanying drawing.

BRIEF DESCRIPTION OF THE DRAWING

The FIGURE of the drawing is a block diagram showing the steps of a preferred method of the present invention.

DESCRIPTION OF THE PREFERRED EMBODIMENT

Many pyrotechnic devices, such as marine location markers and smoke and illumination signals, have a similar formula, and one typical pyrotechnic formulation is comprised of 53 percent of red phosphorus, 34 percent of manganese dioxide, 7 percent of magnesium, 3 percent of zinc oxide and 3 percent of linseed oil.

If the red phosphorus composition is contained in an assembled unit, such as a marine location marker, it is first necessary to separate the red phosphorus composition from the remainder of the hardware. Then the pyrotechnic candle is sawed into sections to facilitate loading into a burning chamber and to provide better ignition and burning. By way of example, a MK 25 Marine Location Marker contains about 1.75 pounds of pyrotechnic composition and the marker should be divided into three sections of about equal weight. The marker can be sawed into sections while immersed under water.

The sectioned pieces of candle are loaded into a first enclosed chamber of an incinerator and the burner is turned on for a sufficient time to ignite the composition and, upon ignition, the burner is turned off. A second enclosed chamber is preheated and the products of combustion are drawn from the first enclosed chamber into the second chamber of the incinerator. The principal product of combustion of red phosphorus composition is phosphorus pentoxide ($P_4O_{10}$) and the preheating of the second enclosed chamber ensures complete combustion and the product gases. From the second chamber of the incinerator, the product gases are drawn into the top of a concurrent water spray, ceramic packed, scrubber column. The water spray containing the product gases forms phosphoric acid which is collected and which is useful as fertilizer.

After combustion of the red phosphorus composition is complete, water is sprayed on the ashes in the first enclosed chamber of the incinerator and phosphine is generated. The burner in the enclosed chamber is ignited for about five minutes and the generated phosphine is combusted. The resultant ashes are chemically inert to water. The spraying of the ashes and burning of the generated phosphine is necessary as phosphine is toxic with a tolerance limit of 0.3 ppm in air.

After burning of the generated phosphine, the residue contains about 40 percent of MnO and can be used as a manganese ore. Another viable use for the combustion residue is in a glazing compound for ceramic wares. Also, the combustion residue can be dumped in a landfill as the ash does not contain any heavy metal contaminants which would be ecologically unacceptable for landfill.

It can thus be seen that the present invention provides a disposal method for red phosphorus compositions which does not pollute the environment. Additionally, products are produced which are safe and have some utility.

Obviously many modifications and variations of the present invention are possible in the light of the above teachings. It is therefore to be understood that the invention may be practiced otherwise than as specifically described.

We claim:

1. A method for disposing of pyrotechnic material comprised of at least fifty percent, by weight, of red phosphorus comprising,
    burning said pyrotechnic material in a first enclosed chamber and passing the products of combustion into a second enclosed chamber,
    then burning said products of combustion in said second enclosed chamber,
    then spraying the products of combustion from the second burning with water to produce phosphoric acid,
    then collecting said phosphoric acid,
    then spraying the ashes in said first enclosed chamber with water to produce phosphine, and
    then burning said phosphine in said first enclosed chamber.

2. A method for disposing of pyrotechnic material comprised of at least fifty percent, by weight, of red phosphorus as set forth in claim 1 wherein said pyrotechnic material is ignited by lighting a burner in said first enclosed chamber and then extinguishing said burner after ignition of said pyrotechnic material.

3. A method for disposing of pyrotechnic material comprised of at least fifty percent, by weight, of red phosphorus as set forth in claim 1 wherein said second enclosed chamber is preheated prior to receiving said products of combustion from said first enclosed chamber.

4. A method for disposing of pyrotechnic material comprised of at least fifty percent, by weight, of red phosphorus as set forth in claim 1 wherein said pyrotechnic material is cut into small pieces prior to loading into said first enclosed chamber.

5. A method for disposing of pyrotechnic material containing manganese dioxide, magnesium, zinc oxide, linseed oil and at least fifty percent, by weight, of red phosphorus comprising, burning said pyrotechnic material in a first enclosed chamber and passing the products of combustion into a preheated second enclosed chamber, then burning said products of combustion in said preheated second enclosed chamber, then spraying the products of combustion from the second burning with water to produce phosphoric acid, then collecting said phosphoric acid, then spraying the ashes in said first enclosed chamber with water to produce phosphine, and then burning said phosphine in said first enclosed chamber.

6. A method for disposing of pyrotechnic material containing manganese dioxide, magnesium, zinc oxide, linseed oil and at least fifty percent, by weight, of red phosphorus as set forth in claim 5 wherein said pyrotechnic material is ignited by lighting a burner in said first enclosed chamber and then extinguishing said burner after ignition of said pyrotechnic material.

7. A method for disposing of pyrotechnic material containing manganese dioxide, magnesium, zinc oxide, linseed oil and at least fifty percent, by weight, of red phosphorus as set forth in claim 5 wherein said pyrotechnic material is cut into small pieces prior to loading into said first enclosed chamber.

8. A method for disposing of pyrotechnic material containing manganese dioxide, magnesium, zinc oxide, linseed oil and at least fifty percent, by weight, of red phosphorus as set forth in claim 7 wherein said pyrotechnic material is cut into small pieces by sawing said pyrotechnic material while submersed in water.

* * * * *